United States Patent
Atanackov

(10) Patent No.: US 6,402,521 B1
(45) Date of Patent: Jun. 11, 2002

(54) APPARATUS FOR DEMONSTRATING CHANGES IN MOTION WITH RESPECT TO TIME

(76) Inventor: Djordje Atanackov, Askerceva cesta 22, Velenje (SI), 3320

(*) Notice: Subject to any disclaimer, the term of this patent is extended or adjusted under 35 U.S.C. 154(b) by 0 days.

(21) Appl. No.: 09/331,572

(22) PCT Filed: Jan. 20, 1998

(86) PCT No.: PCT/SI98/00003

§ 371 (c)(1),
(2), (4) Date: Jun. 29, 1999

(87) PCT Pub. No.: WO98/31986

PCT Pub. Date: Jul. 23, 1998

(30) Foreign Application Priority Data

Jan. 20, 1997 (SI) ................................. 9700010
Jan. 19, 1998 (SI) ................................. 9800010

(51) Int. Cl.$^7$ ............................................. G09B 23/08
(52) U.S. Cl. ................... 434/302; 434/365; 434/300; 434/301; 434/303; 434/276; 250/221; 250/208.1; 250/214 R; 73/514.26; 356/614; 356/622
(58) Field of Search ................................. 434/365, 300, 434/301, 302, 303, 276; 73/514.26; 356/614, 622; 250/221, 208.1, 214 R

(56) References Cited

U.S. PATENT DOCUMENTS 4,645,919 A * 2/1987 McCaleb ................. 250/214 B
4,693,687 A    9/1987 Hwang
4,761,658 A    8/1988 Georgis
4,950,899 A    8/1990 Tachibana

FOREIGN PATENT DOCUMENTS

FR          1.276.999       * 3/1962

* cited by examiner

Primary Examiner—Valencia Martin-Wallace
Assistant Examiner—Chanda Harris
(74) Attorney, Agent, or Firm—Jacobson Holman, PLLC

(57) ABSTRACT

An apparatus for demonstrating changes in motion with respect to time. Two arrays of equally spaced photoresistors and light-emitting diodes are placed on two parallel straight line arrays. Rails upon which an object moves are placed parallel to the arrays. A laser is attached to the object. At any moment of time during the motion of the object, the laser illuminates one or two adjacent photoresistors. Each photoresistor in a line of elements is connected to a first input of a logic AND gate, to whose second input clock pulses are conducted and whose output is connected through a logic flip-flop element to the light-emitting diode. The apparatus provides for demonstration of a motion development in time by conveying a visual demonstration of path sections or intervals traversed by the object in equal time intervals to thereby make possible a picture of whether the motion is steady or accelerated.

14 Claims, 2 Drawing Sheets

APPARATUS FOR DEMONSTRATING CHANGES IN MOTION WITH RESPECT TO TIME

The invention concerns an apparatus for demonstration of a motion development in time [i.e. changes in motion with respect to time, and more precisely an apparatus for a visual demonstration of path sections covered by movement of an object in equal time intervals.

Apparatus for demonstrating the development of motion in time is known where at any moment of time, an experiment records the path covered by an object. For this purpose, a measuring appliance similar to a pulley is used, which a string is laid out by means of which a weight pulls the moving object.] The pulley rotation is then detected by means of a photocell (PASCO Scientific 1994, Physics Experiments and computer Interfaces, Roseville, Calif. 95678-9011, USA). Apparatus for demonstration purposes also known that detects the moment when two or more photogates or photocells are passed by a moving object [and Impromax Mesco učila, SI-2312 Orehova vas).] In each of these systems, either the path covered by the object is measured depending upon the time of motion or upon the time in which the object covers a predetermined path.

In order to vividly demonstrate motion development, it is desirable to permanently mark the points in which a moving object is found at preselected time moments. This was achieved in an apparatus for demonstration disclosed in the U.S. Pat. No. 4,761,658. To a moving object, a paper strip is fastened onto which in equal time intervals ink is forced out from an ink jet head controlled by an oscillator.

For demonstrations, the above-mentioned apparatus uses expendable material like paper strips and ink.

The technical problem to be solved by the present invention is to construct an apparatus for demonstrating motion development in time that, on a straight line parallel to the trajectory of a moving object, points will be marked which correspond (i.e. preferably mapped 1:1) to points in which the moving object was located when the motion started and after multiples of an arbitrarily chosen time interval thereafter.

The above technical problem is solved by the first embodiment of the instant apparatus for demonstrating motion development in time characterized in that, on two parallel straight lines, a first and a second array of uniformly, and in both arrays equally spaced, photosensitive elements and light sources, respectively, are placed. Rails are provided upon which an object moves, in which rails are placed parallel to the arrays. A light source emitting a collimated light beam is placed on the object, which in any moment of time, the motion of the object illuminates one or two adjacent photosensitive elements. Each photosensitive element in a pertinent line of elements is connected to a first input of a logic AND gate, at whose second input clock pulses are provided and whose output is connected through a logic flip-flop element to the second array light source of this line of elements. Preferably, the clock is actuated at the moment when the object starts moving.

A solution to the technical problem is also provided by the second embodiment for demonstrating motion development in time according to the invention having the same mutual arrangement of arrays of photosensitive elements and light sources as well as an object with a light source for emitting a collimated light beam but where the photosensitive elements in each line of elements is connected through a first logic flip-flop element to the light source of the second array in the line and the light source affixed to the object emits a collimated light beam triggered by clock pulses. In this embodiment, at the origin and at the end of the array of the photosensitive elements in any of these two positions, between the light source emitting the collimated light beam and the corresponding photosensitive element, preferably a semitransparent mirror is mounted which partially reflects the collimated light beam to the appropriate one of two photosensitive elements fastened on the moving object and connected to the inputs of a second flip-flop element, whose output is connected to the on/off input switch of the clock.

Both embodiments of the apparatus for demonstrating motion development in time according to the invention are further characterized by a push button provided for resetting the apparatus before performing a demonstration, the push buttom being connected to an input of the first logic flip-flop element, and where the time interval duration between two subsequent clock pulses is adjustable.

Preferably, a tape measure is placed along the array of light emitting sources, the beginning or origin of the tape measure being situated at the first light emitting source of the array. The light source emitting a collimated light beam is a laser, the photosensitive elements are photoresistors and the light sources in the second array are preferably light-emitting diodes.

The apparatus of the invention is remarkable in that it conveys a visual demonstration of path sections covered by the object in equal time intervals and thereby makes it possible to picture whether the motion over particular moments is steady or accelerated. For demonstrations, the apparatus of the invention does not use expendable material such as paper strips and ink.

The invention will now be described by way of the two embodiments and with reference to the accompanying drawings as follows.

Figure 1:
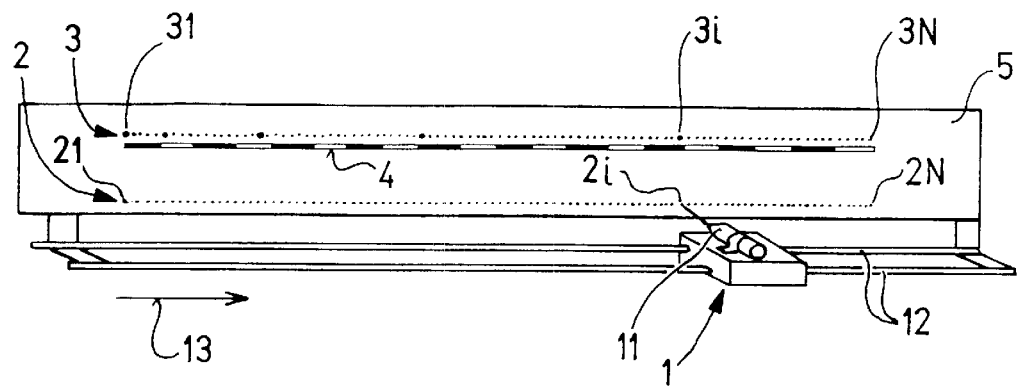
FIG. 1 depicts the first embodiment of the apparatus of the invention for demonstrating motion development in time.
Figure 3:
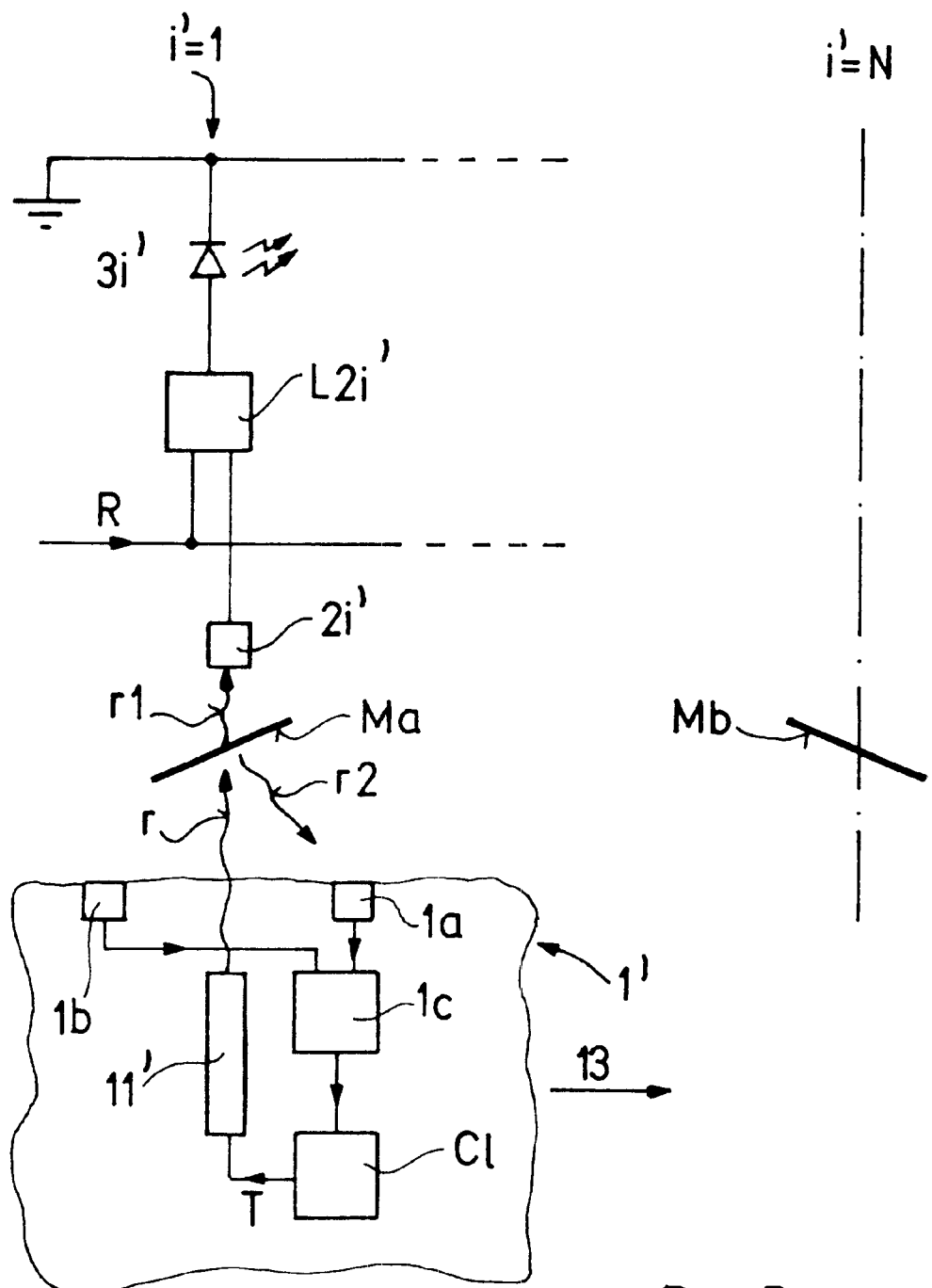
FIG. 3 depicts the second embodiment of the apparatus of the invention for demonstrating motion development in time.

In each of the first and second embodiments of the invention for demonstrating the development of a motion in time, on two parallel straight lines of a demonstration table 5 arrays 2 and 3 of N photosensitive elements $21, \ldots, 2i, \ldots, 2N$; $2i'$, preferably photoresistors, and of N light sources $31, \ldots, 3i, \ldots, 3N$; $3i'$, preferably light-emitting diodes, respectively, are placed on two parallel straight lines on a demonstration table 5 (FIGS. 1 and 3). The distance between two adjacent photosensitive elements is constant throughout the array 2, and the same is true for the distance between two adjacent light sources in the array 3; preferably these distances are equal for both arrays 2, 3. In both embodiments, photoresistors as well as light-emitting diodes have a preferred diameter of 5 mm and in each of the arrays 2, 3 the elements are placed so that they touch each other.

An object 1 is laid out like a cart moving on rails 12. The rails 12 are placed parallel to the arrays 2 and 3. A light source 11 is attached to the object 1. The light source 11 emits a collimated light beam, which in the first embodiment, at any moment of time of the motion of the object 1, the beam illuminates one or two adjacent photosensitive elements $21, \ldots, 2i, \ldots, 2N$. The diameter of the light beam in the plane of the demonstration table 5 is 2 mm. Preferably, the light source 11 is a laser.

Figure 2:
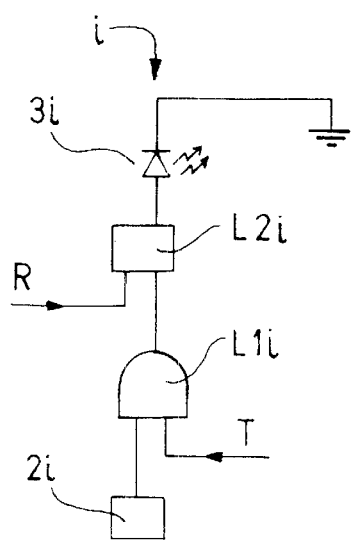
FIG. 2 depicts a circuit line corresponding to an i-th photosensitive element in the first embodiment.

In the first embodiment of the apparatus of the invention, for each photosensitive element $2i$, a line i of circuit elements is provided (FIG. 2); the entire circuit of the apparatus according to the invention consists of N such lines. The photosensitive elements 2i is connected to a first input of a logic AND gate L1i, to whose second input pulses T from a clock (not shown) are conducted. The light source 3i of the array 3 is connected to the output of the logic AND gate L1i through a logic flip-flop element L2i, to a second input of which a reset signal R from the reset push button (not shown) is connected.

The clock is actuated at the moment when the object 1 starts to move. The duration of the time interval between two subsequent clock pulses T is adjustable. A reset push button is also provided to reset the apparatus before performing the demonstration whereby mainly the light sources 3i in the array 3 that were lit from the previous demonstration are switched off.

Along the array 3 of the light emitting sources 3i is a tape measure 4. Its origin or starting point is situated at the first list emitting source 31 of this array 3 and is oriented in the direction of the motion of the object 1 during the experiment (arrow 13).

The demonstration table 5 can be provided on its back side with a magnet. As such, the apparatus can be fastened to a blackboard. Now the inclination of the rails 12 may be chosen as requested to carry out any particular experiment, for example vertical rails 12 for free fall experiments.

From the description of the first embodiment of the i-th line of the circuit pertaining to any individual photosensitive element 2i and also to the light emitting source 3i, it is evident that the light emitting source 3i lights up if the clock pulse T appears when the light beam of the moving light source 11 illuminates just that photosensitive element 2i. In other words, pulses T arriving in uniform time intervals turn on that light source 3i and open that logic AND gate L1i to the second input of which the photosensitive element 2i is connected which at that moment is illuminated by the light source 11 form the moving object 1. The light sources 3i in the array 3, which have been turned on during the experiment, remain lit until reset by means of the signal R.

In a second embodiment of the apparatus of the invention, to each photosensitive element 2i', a line i' of circuit elements is provided (FIG. 3). The entire circuit of the apparatus according to the invention consists of N such lines. The photosensitive element 2i' is connected to a first input of a logic flip-flop element L2i' to whose second input a reset signal R is conducted from a reset push button (not shown) and whose output is connected to the light source 3i' in the array 3.

At the beginning and at the end of the array 2 of the photosensitive elements 2i' at each of these two extreme positions, between the light source 11' emitting the collimated light beam and the corresponding photosensitive element 2i', a semitransparent mirror Ma, Mb is mounted. In each of these two extreme positions of the body 1' the semitransparent mirror Ma, Mb is struck by the collimated light beam r from the light source 11'; the transmitted partial light beam r1 strikes the photosensitive element 2i', the reflected partial light beam r2, however, strikes the appropriate one of two photosensitive elements 1a, 1b fastened to the object 1'. The outputs of the photosensitive elements 1a, 1b are connected to the inputs of the flip-flop 1c, whose output is connected to the turn on/off input of a clock C1.

In this second embodiment, the light source 11' with collimated light beam r, preferably a laser, radiates a flash each time when its control input receives a control signal T from the clock C1. Therefore, when the object 1' moves, the transmitted partial light beam r1 illuminates only a few photosensitive elements 2i' which are turned on. The clock C1 starts and stops to operate when the reflected partial light beam r2 strikes the photosensitive element 1a and 1b, respectively.

In the described embodiments the error absolute value of the measured value of the instantaneous position of the object 1 is obviously ±2.5 mm and the error absolute value of the measured interval length of the covered path is ±5.0 mm. Since a typical interval length is approximately 250 mm, the error relative value of the measured interval length of the covered path is approximately ±2%, which is acceptable for demonstration purposes.

What is claimed is:

1. Apparatus for demonstrating changes in motion with respect to time, comprising a first array of photosensitive elements (21, ..., 2i, ..., 2N) and a second array of light emitting sources (31, ..., 3i, ..., 3N), each array placed on two parallel straight lines such that said photosensitive elements and said light emitting sources are spaced uniformly and, in both arrays, equally, an object, and rails upon which said object is movable, said rails placed parallel to said first and second arrays, a light beam source for emitting a collimated light beam fastened to said object, wherein said light beam source, at any moment in time during motion of the object, illuminates at least one of said photosensitive elements, and wherein each photosensitive element within said parallel line of photosensitive elements is connected to a first input of a logic AND gate, and a clock for providing clock pulses to a second input of said AND gate, and wherein an output of said AND gate is connected to a logic flip-flop element, the output of which is connected to the corresponding light emitting source to activate the light emitting source.

2. Apparatus for demonstrating changes in motion with respect to time as claimed in claim 1, wherein said clock pulses begin to be provided when the object starts moving.

3. Apparatus for demonstrating changes in motion with respect to time as claimed in claim 2, further comprising a push button for resetting the apparatus prior to the start of a demonstration, said push button connected to an input of said logic flip-flop element, and wherein said clock pulses from said clock are adjustable to vary the time interval between two successive clock pulses.

4. Apparatus for demonstrating changes in motion with respect to time as claimed in claim 3, further comprising a tape measure placed along said array of light emitting sources, the beginning of said tape measure situated at the first light emitting source of the array.

5. Apparatus for demonstrating changes in motion with respect to time as claimed in claim 4, wherein said light beam source for emitting a collimated light beam is a laser.

6. Apparatus for demonstrating changes in motion with respect to time as claimed in claim 5, wherein said photosensitive elements are photoresistors.

7. Apparatus for demonstrating changes in motion with respect to time as claimed in claim 6, wherein said light emitting sources in the array are light-emitting diodes.

8. Apparatus for demonstrating changes in motion with respect to time, comprising a first array of photosensitive elements (2i') and a second array of light emitting sources (3'), each array placed on two parallel straight lines such that said photosensitive elements and said light emitting sources are spaced uniformly and, in both arrays, equally, an object, and rails upon which said object is movable, said rails placed parallel to said first and second arrays, a light beam source for emitting a collimated light beam fastened to the object, and a clock for issuing pulses to trigger the light beam source to flash, such that during the movement of the object, a flash of the light beam source illuminates at least one photosensitive element, and wherein each photosensitive element within said parallel line of photosensitive elements is connected to a first logic flip-flop element, an output of which is connected to said light emitting source.

9. Apparatus for demonstrating changes in motion with respect to time as claimed in claim 8, wherein at the beginning and at the end of said array of photosensitive elements, between said light beam source for emitting the collimated light beam and the corresponding photosensitive element, a semitransparent mirror is mounted for partially reflecting the collimated light beam to one of two object mounted photosensitive elements which are fastened to said object and which are connected to an input of a second flip-flop element, the output of said second flip-flop element connected to a turn on/off input of said clock.

10. Apparatus for demonstrating changes in motion with respect to time as claimed in claim 9, further comprising a push button for resetting the apparatus prior to the start of a demonstration, said push button connected to an input of said first logic flip-flop element, and wherein said clock pulses from said clock are adjustable to vary the time interval between two successive clock pulses.

11. Apparatus for demonstrating changes in motion with respect to time as recited in claim 10, further comprising a tape measure placed along said array of light emitting sources, the beginning of which is situated at the first light emitting source of the array.

12. Apparatus for demonstrating changes in motion with respect to time as claimed in claim 11, wherein said light beam source emitting a collimated light beam is a laser.

13. Apparatus for demonstrating changes in motion with respect to time as claimed in any claim 12 wherein said photosensitive elements are photoresistors.

14. Apparatus for demonstrating changes in motion with respect to time as claimed in claim 13, wherein said light sources in the array are light-emitting diodes.

* * * * *